United States Patent Office 3,379,692
Patented Apr. 23, 1968

3,379,692
AMIDE-URETHANE COPOLYMERS
Jack Preston, Raleigh, N.C., assignor to Monsanto
Company, a corporation of Delaware
No Drawing. Filed Aug. 8, 1963, Ser. No. 300,940
2 Claims. (Cl. 260—77.5)

This invention relates to new amide-urethane copolymers and more particularly to amide-urethane copolymers prepared from the reaction of bischloroformates and wholly aromatic diamines containing carbonamide linkages.

Polyamide and polyurethane polymers are well known in the prior art. Aromatic polyamides are known to have very high heat resistance in comparison with ordinary or aliphatic type polyamides. Urethane polymers have different useful characteristics such as resistance to degradative conditions and various types of elastic properties. A combination within one polymeric composition of both urethane linkages and amide linkages derived from an aromatic monomer containing preformed amide linkages present the best features of both linkages.

It is, therefore, an object of the present invention to provide new compositions of matter comprising an amide-urethane copolymer containing amide segments alternating regularly with urethane segments.

It is another object of the invention to provide amide-urethane copolymers and shaped articles thereof prepared from the reaction of bischloroformates and wholly aromatic diamines containing carbonamide linkages derived from aromatic amino acids.

Another object of the invention is to provide a process for the preparation of amide-urethane copolymers.

Other objects and advantages of the invention will become apparent from the description which follows.

These and other objects in general preferably are accomplished by preparing an acetic solution or a neutral slurry for the symmetrical aromatic diamine containing a preformed amide linkage, adding to this solution a proton acceptor, an emulsifier and a solution of a suitable bischloroformate and stirring the resulting mixture until the polymerization reaction is complete. The polymer may then be recovered, preferably by filtering, washing and drying. Alternatively, the aforementioned diamine may be reacted with a suitable bischloroformate in solution.

The amide-urethane copolyamides of this invention may be represented by the following general formula:

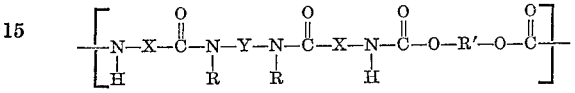

wherein X and Y represent divalent aromatic radicals, wherein X may and Y must exhibit at least one plane of symmetry, R represents hydrogen, phenyl or a lower alkyl group, and R' represents a divalent alkylene or arylene group. X and Y may be single, multiple or fused ring aromatic radicals and may have one or more of the hydrogens in each ring replaced by non-polyamide forming substituents such as alkyl, aryl, halogen, alkoxy and the like. As examples of representative polymers coming within the purvue of the above general formula, the following may be mentioned, (1)
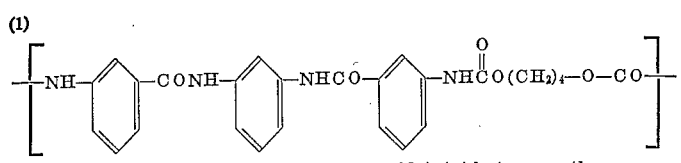
Poly-N,N'-m-phenylenebis(m-benzamide)-1,4-butane-urethane (2)
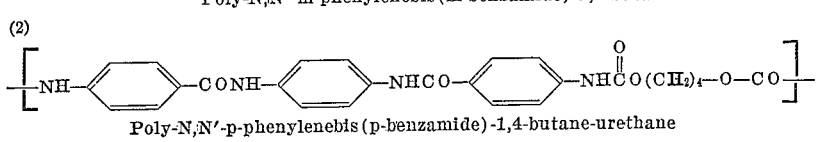
Poly-N,N'-p-phenylenebis(p-benzamide)-1,4-butane-urethane (3)
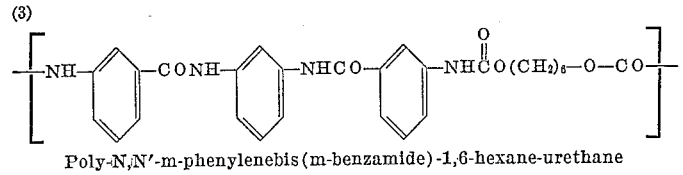
Poly-N,N'-m-phenylenebis(m-benzamide)-1,6-hexane-urethane (4)
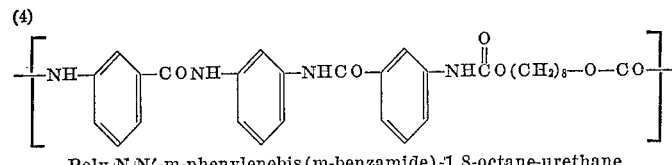
Poly-N,N'-m-phenylenebis(m-benzamide)-1,8-octane-urethane (5)
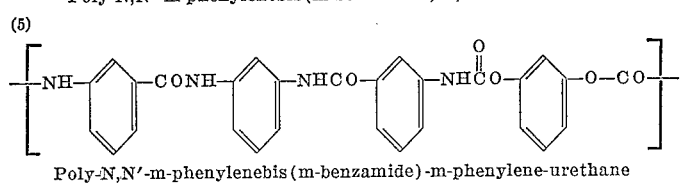
Poly-N,N'-m-phenylenebis(m-benzamide)-m-phenylene-urethane The preparation of these polymers involves interfacial or solution techniques. The solution polymerization method may be generally described as follows. The diamine is dissolved in a suitable solvent which is inert to the polymerization reaction. The same solvents may be employed for both the diamine and the bischloroformate.

Among such solvents there may be mentioned dimethylacetamide, 1,2-pyrrolidone, 1,5-dimethylpyrrolidone and hexamethylphosphoramide. The solvents are rendered more effective in many instances by mixing them with a smaller amount, up to 10 percent, of an alkali or alkaline earth salt such as lithium chloride, lithium bromide, magnesium chloride, magnesium bromide, beryllium chloride or calcium chloride. The preferred solvent for solution polymerization is dimethylacetamide or dimethylacetamide containing dissolved lithium chloride. The diamine solution is cooled to between 0 and −20° C. The bischloroformate is added either alone or in a solution of one of the aforementioned solvents. The mixture is stirred for a period of time until polymerization is substantially complete and a high viscosity is obtained. The solution of polymer is neutralized by the addition of lithium hydroxide or any other suitable neutralizing agent.

The interfacial polymerization reaction is conducted by mixing water, an emulsifier and the diamine or its dihydrochloride. A proton acceptor is then added and the mixture stirred rapidly. During this rapid stirring a solution of the bischloroformate in an organic solvent is added. The mixture is stirred until polymerization is complete. The polymer may then be isolated preferably by filtration and is washed and dried. The bischloroformate solvent may be a cyclic nonaromatic oxygenated organic solvent such as cyclic tetramethylene sulfone, 2,4-dimethyl cyclic tetramethylene sulfone, tetrahydrofuran, propylene oxide and cyclohexanone. Further suitable solvents for the bischloroformate which may be used in an interfacial reaction include chlorinated hydrocarbons such as methylene chloride, chloroform and chlorobenzene, also benzene, acetone and nitrobenzene, benzonitrile, acetophenone, acetonitrile, toluene, and mixtures of the above solvents such as tetrahydrofuran and benzonitrile, tetrahydrofuran and acetophenone, benzene and acetone, and the like.

Suitable emulsifying agents for interfacial polymerization include anionic and nonionic compounds such as sodium lauryl sulfate, nonyl phenoxy (ethyleneoxy) ethane, the sodium or potassium salt of any suitable condensed sulfonic acid and the like. A proton acceptor as the term is employed herein indicates a compound which acts as an acid scavenger to neutralize HCl formed during the reaction. Suitable proton acceptors include sodium carbonate, sodium hydroxide, potassium hydroxide, tertiary amines such as triethylamine, trimethylamine, tripropylamine, ethyldimethylamine, tributylamine and similar compounds which react as desired.

The amounts of the various reactants which may be employed will, of course, vary according to the type of polymer desired. However, in most instances substantially equimolar quantities or a slight excess of bischloroformate to diamine may be used. For interfacial polymerization reactions sufficient proton acceptor to keep the acidic by-products neutralized is added, the exact amount easily determined by one skilled in the art.

The diamines which are used in the practice of the invention have the following general formula:

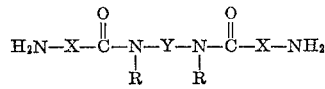

wherein R is hydrogen, lower alkyl or phenyl and wherein X and Y represent aromatic radicals. These aromatic radicals may have a single, multiple or fused ring structure and may have one or more of the hydrogens in each ring replaced by nonpolyamide forming substituents such as alkyl, aryl, halogen, alkoxy and the like. These diamines are symmetrical diamines and will enter into the polymer chain in a fixed or ordered manner. These symmetrical diamines are polymerized to yield polymers having desirable characteristics, such as the ability to be crystallized, and other fiber former properties. Since only one Y radical is present, all Y aromatic radicals must be symmetrical. That is, they must have at least one plane of symmetry. This symmetrical configuration is necessary in order for the diamine to be useful in the preparation of high molecular weight, crystalline, fiber-forming polymers. Since there are two X radicals present, the overall symmetry of the diamine is preserved. For example, Y cannot be 1,7-naphthalene when a fiber-forming composition is desired because a 1,7-naphthalene unit is not a symmetrical radical. Whereas, X may be 1,7-naphthalene or other unsymmetrical radicals because there are two X radicals to balance each other and preserve symmetry. Thus, it may be seen that the diamines of the invention may have all phenylene rings or may have a combination of phenylene, naphthylene and biphenylene rings that are substituted or unsubsubstituted or other multiple and fused ring structures so long as the overall symmetry of the diamine is maintained. A further disclosure of these diamines and a method for their preparation is revealed in copending application of Preston et al., Ser. No. 222,933 filed Sept. 11, 1962, now U.S. Patent 3,242,213. As typical examples of suitable diamines coming within the scope of the above general formula there may be mentioned N,N'-m-phenylenebis(m-aminobenzamide).
N,N'-m-phenylenebis(p-aminobenzamide),
N,N'-p-phenylenebis(m-aminobenzamide),
N,N'-p-phenylenebis(p-aminobenzamide),
N,N'-2,7-naphthylenebis(p-aminobenzamide),
N,N'-1,5-naphthylenebis(m-aminobenzamide),
N,N'-1,5-naphthylenebis(p-aminobenzamide),
N,N'-2,7-naphthylenebis(m-aminobenzamide),
N,N'-m-phenylenebis(7-amino-2-naphthylamide),
N,N'tetramethyl-p-phenylenebis(4'-aminobiphenyl-4-carbonamide) and the like.

The bischloroformates which are useful in the invention include any and all of the well known alkane bischloroformates and aromatic bischloroformates as represented by the general formula:

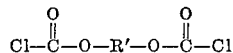

wherein R' is a divalent aromatic or aliphatic hydrocarbon radical such as alkylene orarylene radicals containing from 2 to 12 carbon atoms. Examples of suitable bischloroformates include ethane bischloroformate, 1,3-propane bischloroformate, 1,4-butane bischloroformate, 1,5-pentane bischloroformate, 1,6-hexane bischloroformate, 1,7-heptane bischloroformate, 1,8-octane bischloroformate, 1,9-nonane bischloroformate, 1,10-decane bischloroformate, resorcinol bischloroformate, hydroquinone bischloroformate, etc.

The polymers of this invention have many highly desirable characteristics. The flexibility of the polymer chain due to the presence of the urethane linkages in combination with the high temperature resistance imparted by the aromatic polyamide linkages render such compositions useful as blending components with polyamides and other polymeric compositions to increase modulus and impart to them other valuable characteristics. The amide-urethane copolymers of the invention are easily dissolved. This property in addition to their flexibility and temperature resistance render them useful for a variety of applications. These polyamide urethane copolymers produce excellent filaments, fibers and films of temperature resistant quality.

To further illustrate the present invention and the advantages thereof, the following specific examples are given, it being understood that these are merely intended to be illustrative. In the examples all parts and percents are by weight unless otherwise indicated.

Example I

A solution prepared from 3.46 gms. (0.01 mol) of N,N'-m-phenylenebis(m-aminobenzamide) and 25 ml. of 1 N HCl was cooled to about 0° C. and placed in a blender jar with 40 ml. of water, 6 gms. of anhydrous sodium carbonate and 0.2 gms. of sodium n-lauryl sulfate. A solution of 2.15 gms. (0.01 mol) of 1,4-butane-bischloroformate in 60 ml. of tetrahydrofuran was added all at once. The mixture was stirred for 35 minutes. Evaporation of tetrahydrofuran occurred during the latter 15 minutes of the stirring and the polymer (1), precipitated from the tetrahydrofuran polymer phase. The polymer was washed, dried, and a small amount dissolved in dimethylacetamide containing 5 percent dissolved lithium chloride to yield a very viscous solution from which a good clear film was cast. A DTA (Differential Thermal Analysis) indicated that the melting point was 300° C. with decomposition.

Example II

A solution prepared by heating 3.46 gms. (0.01 mol) of N,N'-m-phenylenebis(m-aminobenzamide) in 60 ml. of 0.3 N HCl was cooled to about 0° C. and added to a blender jar containing 0.1 gm. of sodium n-lauryl sulfate and 5 gms. of anhydrous sodium carbonate. A solution of 2.35 gms. (0.01 mol) of resorcinol bischloroformate in 70 ml. of tetrahydrofuran was added and the mixture stirred rapidly for 30 minutes. A rubbery polymer was obtained which solidified after being washed in hot water and dilute acid. The polymer (5), was filtered and dried and gave a melting point of ca. 280° C. A film was formed from a dope of the polymer in dimethylacetamide containing 5 percent dissolved lithium chloride.

The foregoing detailed description has been given for clearness of understanding only and unnecessary limitations are not to be construed therefrom. The invention is not to be limited to the exact details determined and described since obvious modifications will occur to those skilled in the art, and any departure from the description herein that conforms to the invention is intended to be included within the scope of the claims.

I claim:

1. A new composition of matter capable of forming films comprising an aromatic amide urethane copolymer having the formula

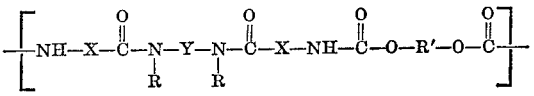

wherein X and Y are phenylene, R is selected from hydrogen, phenyl or lower alkyl and R' is tetramethylene.

2. A process for the preparation of poly-N,N'-m-phenylenebis(m - benzamide)-1,4-butane-urethane comprising reacting together substantially equimolar proportions of N,N'-m-phenylenebis(m - aminobenzamide) and 1,4-butane bischloroformate in the presence of an organic solvent, an emulsifier and an acid acceptor and stirring the mixture at a temperature of from 0° C. to −20° C.

References Cited

UNITED STATES PATENTS

| | | | |
|---|---|---|---|
| 2,800,464 | 7/1957 | Miller | 260—77.5 |
| 3,006,899 | 10/1961 | Hill | 260—78 |
| 3,049,518 | 8/1962 | Stephens | 260—78 |
| 3,240,760 | 3/1966 | Preston et al. | 260—78 |
| 3,242,213 | 3/1966 | Preston et al. | 260—558 |
| 3,254,056 | 5/1966 | Lovell | 260—77.5 |
| 2,448,853 | 9/1948 | Allen et al. | 260—558 |

DONALD E. CZAJA, *Primary Examiner.*

LEON J. BERCOVITZ, *Examiner.*

F. McKELVEY, *Assistant Examiner.*